UNITED STATES PATENT OFFICE.

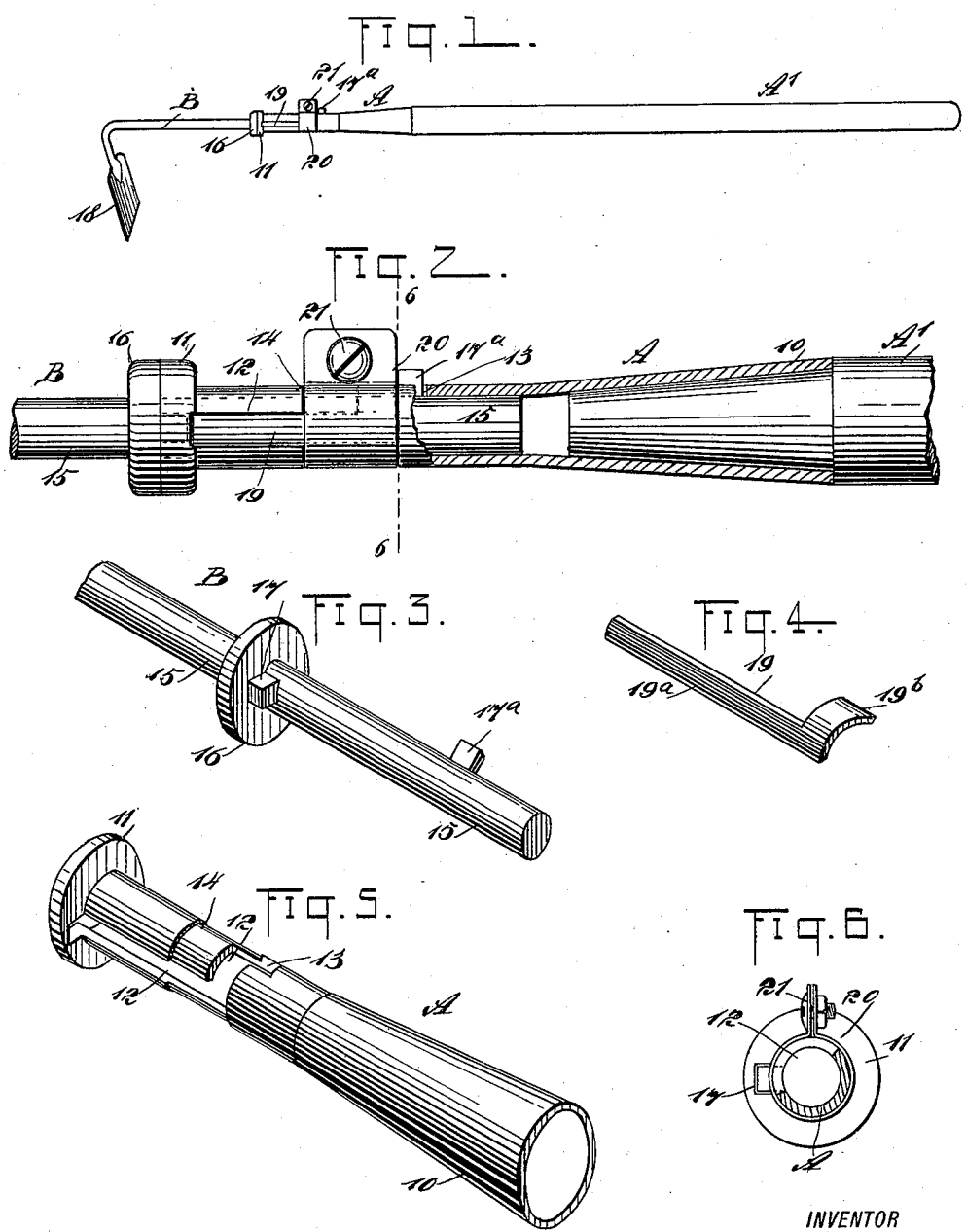

JOHN M. RICHARDSON, OF DAINGERFIELD, TEXAS.

TOOL-HOLDER.

SPECIFICATION forming part of Letters Patent No. 589,303, dated August 31, 1897.

Application filed February 2, 1897. Serial No. 621,692. (No model.)

*To all whom it may concern:*

Be it known that I, JOHN M. RICHARDSON, of Daingerfield, in the county of Morris and State of Texas, have invented a new and Improved Tool-Holder, of which the following is a full, clear, and exact description.

The object of my invention is to provide a holder for any class of tools, but being especially adapted for hatchets, garden-tools, and tools of like character.

A further object of the invention is to so construct the holder that the tool that is placed therein may be expeditiously and conveniently applied to the holder and firmly and securely held in position when placed in said holder.

Another object of the invention is to construct a tool-holder capable of the foregoing functions which will be simple, durable, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the tool-holder complete and a hoe secured therein. Fig. 2 is a partial side elevation and partial vertical section of the tool-holder, being drawn on an enlarged scale. Fig. 3 is a detail perspective view of a portion of the tool-shank. Fig. 4 is a detail perspective view of a key used in connection with the tool-holder. Fig. 5 is a detail perspective view of the body portion of the tool-holder, and Fig. 6 is a section taken substantially on the line 6 6 of Fig. 2.

The body of the tool-holder consists in a socket A, the rear end 10 whereof is conical or bell-shaped, being adapted to receive the outer or forward end of a handle A'. The other portion of the socket is preferably given a cylindrical form and terminates at its forward end in a flange 11. A bayonet or L slot 12 is made in the cylindrical portion of the socket, extending through the flange 11, and in the rear wall of the shorter or circumferential member of this slot 12 a counter-slot or a recess 13 is made. A recess 14 is also produced upon the exterior of the cylindrical portion of the socket, extending circumferentially thereon from the rear wall of the circumferential slot 12 a predetermined distance in a forwardly direction, as is particularly shown in Fig. 5.

A shank B (shown in Fig. 3) is provided to enter the cylindrical portion of the socket A. The shank B consists of a body 15, which is preferably of cylindrical shape and is provided at its rear portion with a flange 16. Adjacent to the flange 16 a lug 17 is formed on the body of the shank, and a second lug 17$^a$ is likewise formed upon the said body at the rear of the shank 17, occupying a position at right angles thereto. The tool 18, a hoe for example, as shown in Fig. 1, is secured to the forward or outer end of the shank B and is practically an integral portion thereof, as illustrated in said Fig. 1.

The shank is passed through the longitudinal portion of the bayonet-slot 12 in the socket until the inner lug 17$^a$ strikes the inner wall of the circumferential portion of the said slot, whereupon the shank is given a quarter-turn, which will bring the lug 17$^a$ opposite the recess 13 in the said circumferential portion of the slot 12, whereupon the shank is carried rearward or inward until the lug 17$^a$ enters the aforesaid recess 13 and the lug 17 enters that portion of the longitudinal section of the slot 12 which is made in the flange 11, so that the shank is prevented from turning, and at the same time the flange 16 on the shank will be brought in close engagement with the flange 11 on the socket.

As a further precaution against the shank turning in the socket a key 19 is provided. (Shown in Fig. 4.) This key consists of a long member 19$^a$, the inner face whereof is concaved, and a curved member 19$^b$ at an angle to the long member. In fact the key 19 corresponds in contour to the contour of the bayonet-slot 12, which it is adapted to enter. When the key is placed in position, its member 19$^a$ will rest against the lug 17 on the shank and will fill the longitudinal section of the slot 12 in the socket, while the shorter curved member 19$^b$ of the key will completely fill the shorter member of the said bayonet-slot and will prevent the lug 17$^a$ from leaving the recess 13 in the socket. The slot 12 is a bayonet-slot only in that it is L-shaped, as preferably one section of the slot is at a right angle to the other.

The key is prevented from leaving the socket by placing a clip 20 over the circumferentially-recessed portion 14 of the socket, which clip may be clamped firmly to the socket by means of a screw 21 or the equivalent of the same. It will be understood that the clip and the key may be connected or may be integral, if in practice it be found desirable.

Under this construction it is evident that any form of a tool may be expeditiously and conveniently placed in a holder and securely held therein against turning or moving in any direction.

If in the manufacture it should be thought best to have the shank of square or rectangular section, the opening in the holder should be of corresponding shape and size. The lugs should under such construction be on the same face of the shank and the recess 13 would be omitted; but the slot 12 and the key 19 will still be L-shaped, the inner surface of the key being shaped so as to fit exactly upon the shank when inserted in the socket. The clamp will remain unchanged.

Having thus described my invention, I claim as new and desire to secure by Letters Patent—

1. A slotted socket, a shank arranged to enter said socket and provided with lugs adapted for locking engagement with the walls of the slot in the socket, a key shaped to fit the said slot, and means for holding the key in the slot, substantially as described.

2. A socket provided with an L-slot, and a recess in a wall of the shorter member of the slot, a shank adapted to enter the socket, lugs on the shank arranged at angles to each other, and a clamping device located upon the socket, serving to prevent the movement of the socket on the shank, as and for the purpose specified.

3. A socket provided with a flange at one end, and an L-slot extending through the flange and having a recess in a wall of its shorter member, a shank likewise provided with a flange, lugs on the shank arranged at angles to one another, a key shaped to enter the L-slot, and a clamp for the said key, substantially as shown and described.

4. A socket provided with an L-slot having a recess at its shorter member, a flange on the socket through which the L-slot extends, the said shank being provided also with a circumferential recess adjacent to the shorter member of the L-slot, a shank provided with a flange, lugs on the shank, placed at angles to one another, a key fitted to the L-slot, and a locking device for the key, substantially as shown and described.

5. The combination, with a socket provided with an L-slot having a recess in the wall of its shorter member, the said socket being provided with a circumferential recess adjacent to the shorter member of the said slot, of a shank adapted to enter the socket, provided with lugs placed at angles to one another and arranged one to enter the recess in the shorter member of the L-slot and the other to be located in the longer member of the said slot, a key fitted to the L-slot, and a locking device for the key, substantially as set forth.

JOHN M. RICHARDSON.

Witnesses:
A. C. RICHARDSON,
D. T. COLQUITT.